E. TYDEN.

EXTENSION TABLE LOCK.

APPLICATION FILED MAY 19, 1909.

Reissued Aug. 24, 1909.

13,014.

3 SHEETS—SHEET 1.

Witnesses:
Frank P. Blanchard
Julia S. Abbott

Inventor:
Emil Tyden
by Burton & Burton
his Attorneys.

E. TYDEN.

EXTENSION TABLE LOCK.

APPLICATION FILED MAY 19, 1909.

Reissued Aug. 24, 1909.

13,014.

3 SHEETS—SHEET 2.

Witnesses:
Frank L. Blanchard
Julia S. Abbott

Inventor:
Emil Tyden
By Burton & Burton
his Attorneys.

E. TYDEN.

EXTENSION TABLE LOCK.

APPLICATION FILED MAY 19, 1909.

Reissued Aug. 24, 1909.

13,014.

3 SHEETS—SHEET 3.

Witnesses:
Frank S. Blanchard
Julia S. Abbott

Inventor
Emil Tyden
By Burton & Burton
his Attorneys

UNITED STATES PATENT OFFICE.

EMIL TYDEN, OF HASTINGS, MICHIGAN.

EXTENSION-TABLE LOCK.

13,014. Specification of Reissued Letters Patent. Reissued Aug. 24, 1909.

Original No. 890,732, dated June 16, 1908, Serial No. 375,804. Application for reissue filed May 19, 1909. Serial No. 497,128.

*To all whom it may concern:*

Be it known that I, EMIL TYDEN, a citizen of the United States, residing at Hastings, in the county of Barry and State of Michigan, have invented new and useful Improvements in Extension-Table Locks, of which the following is a specification, reference being had to the accompanying drawings, forming a part thereof.

The purpose of this invention is to provide an improved means for locking up the top of an extension table. It has the specific purpose, furthermore, of looking up the top of a pedestal extension table in which the top is limitedly extensible without extending the pedestal, so that while the pedestal is locked (or if the pedestal is not extensible) the top being extended to admit the fillers may be closed together embracing the fillers tightly and locked in such completely closed position.

It consists of the features of construction shown and described as indicated in the claims.

Figure 1:
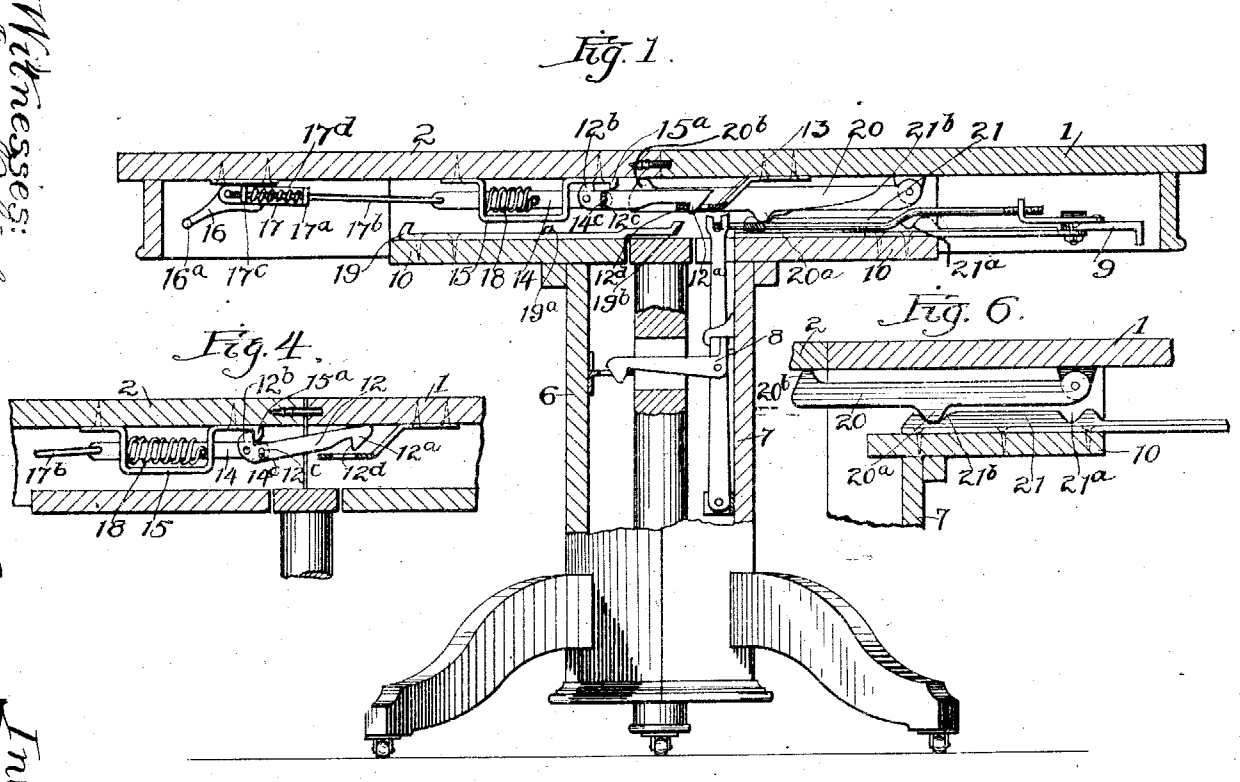
Figure 2:
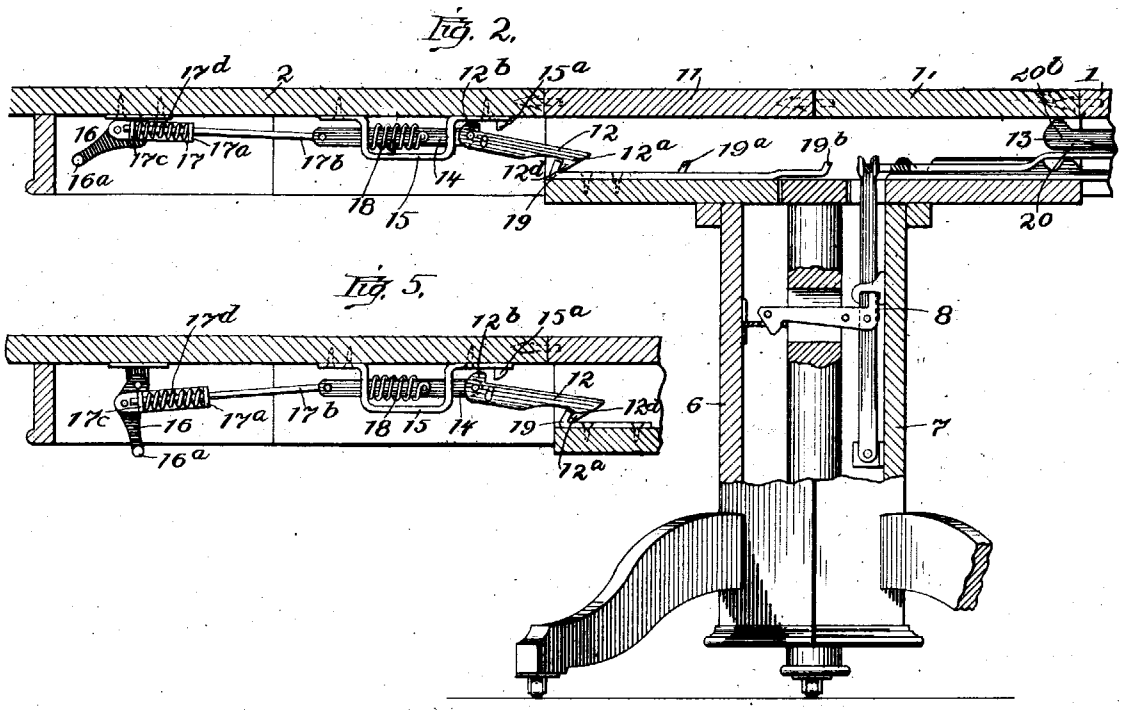
Figure 3:
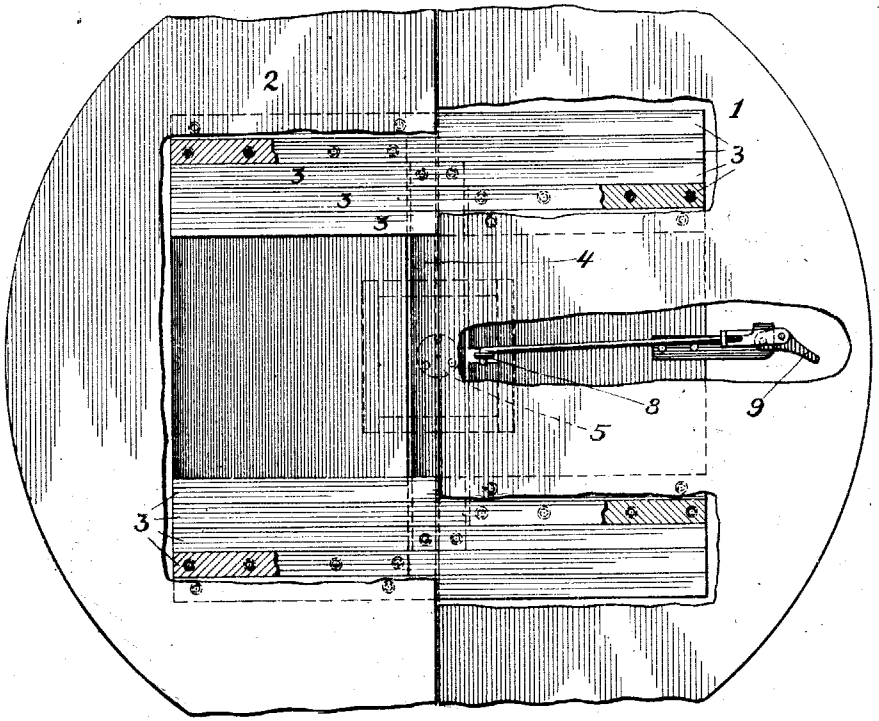

In the drawings:—Figure 1 is a vertical longitudinal section of a pedestal table embodying this invention showing the table unextended, closed and locked. Fig. 2 is a view similar to Fig. 1 of the upper portion of the table showing the table top extended and locked with fillers interposed. Fig. 3 is a plan view with the top in part broken away and the top-locking devices omitted. Fig. 4 is a detail section in the same plane as Figs. 1 and 2 showing the top-locking device in a different position. Fig. 5 is a similar view showing the locking devices in position of engagement for locking up the table when extended, but before completing the locking. Fig. 6 is a detail section in the same plane as Fig. 1 showing a part of the locking device which is partly obscured by other parts in Fig. 1.

The two separable members, 1 and 2, of the table top, it may be understood, are connected in the usual manner by slides, 3, to the middle one of which the center leg, 5, is connected by the bridge, 4. The drawings show this invention applied to a pedestal table in which the pedestal is divided, the two members, 6 and 7, being adapted to inclose the center leg, 5, and being provided with a locking device of familiar construction, which need be indicated only in general, the entire locking parts within the pedestal being denoted by the reference numeral, 8, and the operating lever handle and connections therefrom by the reference numeral, 9. These operating connections are mounted at the end of the cap, 10, of the pedestal member, 7, and are in position to be reached by the operator standing at the end of the table, being within reach from that position even when the table top is extended while the pedestal remains closed, as shown in Fig. 2.

The particular character of the pedestal locking devices are not material, and the form selected for illustration is chosen because of its familiarity, being that shown in my Patent No. 765,644, requiring no further particular description. The table top members are adapted to be extended or spread apart without extending the pedestal, the devices for that purpose being the familiar slides which permit such extension to a definite limit determined by the stops in the slides, which need no description. The drawings indicate the limit of such extension to be sufficient for the introduction of two fillers, 11, 11, and the total distance which the two top members may be separated for this purpose exceeds the width of the fillers, therefore, by at least the added length of the tenons. For clamping and locking up the table top without the fillers, there is provided on the table top member, 2, a hook latch, 12, for the engagement of whose hook nose, $12^a$, there is provided a catch plate or housing, 13, fast on the opposite table member. The hook nose latch, 12, is pivotally connected for operation with a slide or thrust rod, 14, mounted for sliding in a bracket, 15, secured to the table top member, 2. This bracket is formed so as to receive between the bearings of the thrust rod a spring, 18, coiled around the rod connected thereto at one end and at the other end reacting against the bracket for thrusting the rod forward,—that is, toward the parting plane of the table members,—and yieldingly resisting the thrust or pull of the rod in the opposite direction. A link, 17, is connected to the outer end of the thrust rod, 14, the outer end of the link being in turn connected to the operating lever, 16, which is fulcrumed on the under side of the table top member, 2, near the end in convenient position for reaching the operating lever to rock it for drawing and thrusting the rod, 14, in its bearings. When the lever, 16, is rocked to the position shown in Fig. 1, the pivotal connection of the link, 17, being at the opposite side of the fulcrum of the lever from the connection of said link to the rod, 14, and the lever, 16, being stopped against upward movement, the pull of the spring, 18, causes the parts to be locked in that position, which is the position at which the table members are drawn tightly together if the latch, 12, has been first engaged with the latch plate or housing, 13, as shown in Fig. 1, for locking the table top members. The lever, 16, being rocked by pushing inward the handle, 16[a], the tail or trip lug, 12[b], of the latch which projects upward therefrom encounters the abrupt shoulder of a tooth, 15[a], which projects downward just in advance of said trip lug, being conveniently formed on the bracket, 15, as seen, and such encounter causes the latch to be rocked over its pivotal connection to the thrust rod and lifted at the forward end, disengaging its hook nose from the latch plate so that the table members may be separated.

When the table top members are spread for the admission of the two leaves for which provision is made in the extensibility of the slides which carry the top relatively to those which carry the pedestal, the same latch, 12, is designed to be operated by the same means for clamping the two table top members together for taking up the slack or interval necessary for the admission of the tenons, and for that purpose there is mounted upon the pedestal cap, 10, of the pedestal member, 6, near the outer end of said cap, a catch nose or stop, 19, in position to be engaged by the hook nose, 12[a], of the latch, 12. When the table top is drawn outward to the limit of extension provided, the latch, 12, can be dropped low enough so that said stop, 19, shall be in the path of said hook nose of the latch. In order that the latch may be thus lowered at the end and checked at the right position for engagement of its hook nose with the stop, 19, a finger, 14[c], is provided on the forward end of the rod, 14, jutting laterally and taking into a slot, 12[c], in the latch, 12. This slot is long enough vertically to permit the latch a range of vertical movement sufficient to drop its nose to the desired line for encounter with the stop, 19.

The latch cannot drop while engaged with the latch plate nor while its trip lug, 12[a], is pressed against the stop, 15, but if the rod, 14, is retracted by the operation of the lever, 16, when the latch is out of the housing, 13, the trip lug, 12[b], having room for movement to the extent that it would be drawn away from the stop, 15, if the latch did not fall, permits the latch to fall to the extent permitted by the slot, 12[c], and its catch nose is thereby brought into position for engagement with the stop, 19. The engaging shoulder, 12[d], of the hook nose, 12[a], of the latch makes such an angle with the general trend of the latch that when the latch drops to the oblique position necessary to bring its nose in line with the abutment, 19, said shoulder is quite oblique to the horizontal path of the latch in the spreading movement of the table, and the inner face of the abutment, 19, being made similarly inclined so as to be quite acute to said horizontal path, the two shoulders,—of the latch nose and of the abutment,—engage in such manner that the pull of the rod, 14, upon the latch when the lever, 16, is operated for locking, although exerted at a line considerably above the latch nose engagement with the stop will not operate to disengage the parts but only to draw the table members tightly together, clamping between them the interposed fillers. To provide for any swelling of the table top which is liable to occur and make the device operative for locking without overstraining the parts notwithstanding such swelling, and also to make it possible to provide for closing the top together closely, even if there should be a shrinking instead of a swelling of the table top members or fillers or both, the link, 17, is preferably made in two parts, one of the parts having an offset lug, 17[a], through which the other part, 17[b], which is a rod, is inserted, the end of the rod being threaded and provided with a nut, 17[c], between which and the offset lug, 17[a], there is coiled on the rod the spring, 17[b], making the link as a whole yieldingly extensible so that it may be adjusted to require some compression in springing the parts to locked position at the normal dimensions of the table top and fillers,—that is, when they are neither swollen nor shrunken,—and to be susceptible of more compression to accommodate them in case of swelling, being less compressed, but still operate with sufficient tension to draw the parts together in case there is some shrinkage.

It will be obvious that the expedients above described for closing and locking up the table top members of the pedestal table when the pedestal is divided and locked would be applicable without regard to the divided character of the pedestal, since they operate while the pedestal is locked together and is in effect unitary so far as the extension of the top is concerned.

By providing a second catch nose, 19[a], at a point inward from the one with which the latch, 12, is shown engaged in Fig. 2, the table top, 2, may be locked with respect to the pedestal member, 6, at an intermediate point corresponding, for example, to an extension of the top enough to accommodate one filler instead of two. In order that the table may be closed up symmetrically with one filler, it is then desirable to provide means for securing the top of the other pedestal table member relatively to its pedestal at a correspondingly extended position. A convenient expedient for this purpose consists in a lever dog, 20, pivoted to the under side of the top of said opposite table member, 1, having on its lower edge a V-shaped tooth, $20^a$, and mounting upon the top of the pedestal member, 7, an engaging plate, 21, having a V-shaped notch, $21^a$, at a position to be engaged by the tooth, $20^a$, when the top member, 1, is extended relatively to the pedestal member, 7, one-half of the unit filler width. The free end of the lever dog, 20, extends past the inner edge of the table top member, 1, so that it projects under the filler, 11, which may be interposed, and preferably the projecting end of the dog is provided with an upwardly extending nose, $20^b$, which is encountered by the filler when the latter is inserted, causing the lever to be pressed down for holding the tooth, $20^a$, engaged in the notch, $21^a$. The tooth and notch are so sloped that the tooth will readily draw out of the notch in either direction unless the lever dog is thus held down, but when so held the dog and plate are securely engaged with each other and thereby the table top, 1, is securely locked to the pedestal member, 7, at the point of extension indicated.

The plate, 21, may have an additional notch, $21^b$, in position to be engaged by the tooth, $20^a$, when the two table members are closed together without any filler interposed between them, and the nose, $20^b$, of the latch, 20, may be sloped on its end toward the opposite table member so as to be encountered by the lower edge of that member when the table-top members are closed together, with the effect of crowding the latch down to perfect engagement of its tooth, $20^a$, with the notch, $21^b$, if the parts were not perfectly registered and engaged, thereby drawing up the table-top member, 1, to fully closed position for locking when the two top members are pushed together, and thus preventing the extension of the top member, 1, with respect to the pedestal member, 7, unless the top member, 2, is withdrawn with respect to the pedestal member, 6. In order to lock the table together when fully closed with this device, it is only necessary, therefore, to lock the top member, 2, to the pedestal member, 6, which may be done by the engagement of the latch, 12, with a third catch nose or stop or abutment, $19^b$, at the inner end of the same plate which carries the abutments, 19 and $19^a$. This expedient will dispense with the latch plate, 13, on the table top.

It will be understood that when the table-top member is locked on its pedestal member at any one of the limits of extension corresponding to the engagement of the dog, 12, with one or another of the teeth, 19, $19^a$ and $19^b$, the operation of the pedestal lock will clamp the two table members together, both pedestal and top, precisely the same, whether the assemblage be with no filler when $19^b$ is engaged, with one filler when $19^a$ is engaged, or with two fillers when 19 is engaged; and the release of the pedestal lock will permit the two table members, top and pedestal together, to be extended with one or two fillers, precisely as if there were no fillers and as if the table top member were rigidly secured to the pedestal member without fillers, as in the more common form of extension table. This is a purpose of the invention,—to permit the top to be extended to a pre-determined limit corresponding to a desired number of fillers, and then the two members, each thus extended, to be locked by the pedestal lock precisely as the ordinary extension table is locked without fillers.

I claim:—

1. In an extension table, in combination with the table top members, two sets of slides by which they are connected for extension and fillers adapted to be interposed between them; a bridge connecting corresponding slides of the two sets on each table member and means for locking the two bridges together; two coöperating devices carried by the bridge and table top respectively of one table member, which are engageable when the fillers are interposed, for resisting relative extension of said top and bridge, and means for moving one of the two engageable devices for advancing the table top relatively to the bridge toward the parting plane of the two table members.

2. In a pedestal extension table, in combination with the table-top members and their respective pedestal members, means for connecting each table-top member to its pedestal member extensibly and fillers adapted to be interposed when they are extended; means for locking together the pedestal members and coöperating devices carried respectively by the top and pedestal of one table member adapted to be engaged when fillers are interposed for resisting relative extension of the top and pedestal member and means for moving one of said engaged devices to advance the table top member relatively to the pedestal member toward the parting plane of the table members.

3. In an extension table, in combination with the table top members and the two sets of slides by which they are connected for extension; a bridge connecting corresponding slides of the two sets on each table member; means for locking the two bridges together; a latch carried by one table-top member; a device carried by the opposite table-top member adapted to be engaged by the latch; a device carried by the bridge of the same table member which carries the latch adapted to be engaged by the latch when the table top is extended relatively to the bridge to limit such extension and means connected with the latch carried by the same table-top member for operating it after it is engaged for advancing the table-top member relatively to the part on which the latch is engaged and for securing it at advanced position.

4. In a pedestal extension table, in combination with the two table-top members and their respective pedestal members, means by which they are extensibly connected, means for locking together the two table-top members comprising a latch on one member and an engaging device on the other; a device carried by the pedestal of the member having the latch for coöperating with the latter to resist extension of said member, in position for engagement with the latch when the top is extended relatively to the pedestal a pre-determined distance; fillers adapted to be inserted between the table-top members when they are thus extended; a link carried by the latch-carrying member connected to the latch for longitudinal movement of the latter; a spring operating on said link for thrusting it toward the parting plane of the table members, the latch having an offset, and an abutment carried by the table top encountered by the offset in such thrusting movement for disengaging the latch; means for pulling the link in the opposite direction, and a stop for limiting the pivotal movement of the latch relative to the link.

5. In a pedestal extension table, in combination with the two table members comprising each a table top and its pedestal member; means by which the top and pedestal member are extensibly connected and by which the pedestal members are extensibly connected with each other; means for locking together the pedestal members while the table-top members remain relatively extensible; coöperating devices on the two table-top members adapted to be engaged, one of said devices being movable on the table top which carries it and means for so moving it to draw said table-top members together when said devices are engaged, and a device carried by the pedestal member pertaining to the table top having said movable engaging device adapted to be engaged by the latter when the table-top is extended relatively to the pedestal to limit such extension.

6. In a pedestal extension table having the table-top members extensible relatively to their respective pedestal members, in combination with such table-top members and pedestal and means by which the table-top members are connected together extensibly with respect to each other and with respect to the pedestal; coöperating devices carried respectively by the pedestal and one table-top member positioned for engagement with each other when the table-top members are extended and fillers are interposed, and adapted by such engagement to resist relative extension of said table-top member and the pedestal.

7. In a pedestal extension table having table-top members extensible relatively to their respective pedestal members, in combination with such table top members and pedestal and means by which the table-top members are connected together extensibly with respect to each other and with respect to the pedestal; coöperating devices carried respectively by the pedestal and one table-top member positioned for engagement with each other when the table-top members are extended and fillers are interposed, for resisting relative extension of said top member and pedestal, and adapted for drawing them relatively in opposite directions.

8. In a pedestal extension table having the table-top members extensible relatively to their respective pedestal members, in combination with such table-top members and pedestal and means by which the table-top members are connected together extensibly with respect to each other and with respect to the pedestal; two coöperating devices carried respectively by the pedestal and one table-top member positioned for engagement with each other when the table-top members are extended and fillers are interposed, and adapted when engaged for resisting relative extension of said top member and pedestal, and means for moving one of the two engaging devices relatively to the part on which it is mounted, for advancing the table-top member relatively to the pedestal toward the parting plane of the two table-top members.

9. In a pedestal extension table, in combination with the pedestal members, the table-top members and means by which they are extensibly connected together and to their respective pedestal members; coöperating devices carried respectively by one table-top member and its pedestal member for engaging one top member with its corresponding pedestal member for limiting its extension relatively thereto at definite points, and coöperating devices carried by the other pedestal and table-top members respectively adapted to be engaged for resisting their relative extension and forcing the top member inward relatively to the pedestal member.

10. In a pedestal extension table having the table-top members extensible relatively to their respective pedestal members, the combination with means on one table member for engaging the top with the pedestal and forcing it inward relatively thereto; a dog carried by the top of the opposite table member and an engaging plate carried by the corresponding pedestal member adapted to be engaged by the dog at definite points in the relative adjustment of said top member with respect to its pedestal member, the dog being extended inward past the edge of the table member so as to be stopped against upward movement by encounter with the under side of the opposite table top member or fillers for securing the engagement of the dog with the plate.

11. In a pedestal extension table having the table top members extensible relatively to their respective pedestal members, one table top and its pedestal member having coöperating devices for engaging them together adapted for forcing the table top inward relatively to the pedestal, the other table member having upon the top a dog provided with a downwardly projecting V-shaped tooth and upon the pedestal a plate having V-shaped notches for engaging the tooth at definite positions in the relative adjustment of the top and pedestal of said member, the dog being extended past the edge of said table member toward the other member for encounter with the lower side of the opposite table member or fillers for holding its tooth engaged with one of said notches.

12. In an extension table comprising a supporting member and top members which are movable thereon for extension to admit fillers, in combination with such supporting member and top members, coöperating devices carried respectively by the supporting member and one top member positioned for engagement with each other when said top member is extended for insertion of one or more fillers, and adapted by such engagement to resist relative extension of said top member and supporting member.

13. In an extension table comprising a supporting member and top members movable thereon for extension to admit fillers, in combination with such supporting member and top members, a dog carried by one of the top members, and an engaging device carried by the supporting member adapted to be engaged by the dog at definite points in the extension movement of said top member, the dog being extended inward past the meeting edge of the top member so as to be stopped against upward movement by encounter with the under side of the opposite top member or fillers, for securing the engagement of the dog with the plate.

14. In an extension table comprising a supporting member and top members movable thereon for extension to admit fillers, in combination with such supporting member and top members a dog carried by one of the top members; an engaging device carried by the supporting member adapted to be engaged by the dog at definite points in the extension movement of said top member, the dog being extended inward past the meeting edge of the top member so as to be stopped against upward movement by encounter with the under side of the opposite top member or fillers, for securing the engagement of the dog with the plate, and means by which the edges of the top members and fillers are engaged with each other for preventing upward movement of the fillers.

15. In an extension table comprising a supporting member and top members movable thereon for extension to admit fillers, in combination with such supporting member and top members, a dog carried by one of the top members; an engaging device carried by the supporting member adapted to be engaged by the dog at definite points in the extension movement of the top member for resisting movement in either direction from the position of such engagement, the dog being extended inward past the meeting edges of the top members so as to be stopped against upward movement by encounter with the under side of an interposed filler, for securing the engagement of the dog with the engaging device, and means for engaging the filler with said top member to resist upward displacement of the filler.

16. In an extension table comprising a vertically divided supporting member and top members movable on the supporting member for extension to admit fillers, a dog carried by one top member, an engaging device carried by the corresponding part of the supporting member adapted to be engaged by the dog at definite points in the extension movement of the top member for resisting movement of the top member in either direction away from the point of such engagement, the dog being extended inward past the meeting edges of the table members so as to be stopped against upward movement by encounter with any interposed filler, such filler provided with means for engaging the top member to prevent upward displacement of the filler, and means for drawing and securing the divided portions of the supporting member together.

17. In an extension table comprising a supporting member and top members which are movable thereon for extension to admit fillers, in combination with such supporting member and top members, coöperating devices positioned on the one hand by the supporting member and on the other hand by the top members respectively for engagement when the top members are extended for insertion of a filler or fillers, and adapted by such engagement to resist extension.

In testimony whereof, I have hereunto set my hand, at Chicago, Illinois, this 15th day of May, 1909.

EMIL TYDEN.

Witnesses:
M. Gertrude Ady,
Julia S. Abbott.